(12) United States Patent
Gopalakrishna (10) Patent No.: US 9,037,865 B1
(45) Date of Patent: May 19, 2015

(54) METHOD AND SYSTEM TO SECURELY SEND SECRETS TO USERS

(71) Applicant: CA, Inc., Islandia, NY (US)

(72) Inventor: Rajendra A. Gopalakrishna, Bangalore (IN)

(73) Assignee: CA, Inc., New York, NY (US)

( * ) Notice: Subject to any disclaimer, the term of this patent is extended or adjusted under 35 U.S.C. 154(b) by 57 days.

(21) Appl. No.: 13/784,176

(22) Filed: Mar. 4, 2013

(51) Int. Cl.
*G06F 21/62* (2013.01)
*G06Q 20/38* (2012.01)
*G07F 7/10* (2006.01)
*G06Q 20/36* (2012.01)
*H04L 9/08* (2006.01)

(52) U.S. Cl.
CPC .......... *H04L 9/0816* (2013.01); *G06Q 20/3829* (2013.01); *G07F 7/1016* (2013.01); *G06Q 20/363* (2013.01); *G07F 7/1091* (2013.01); *G06F 21/6209* (2013.01)

(58) Field of Classification Search
CPC ............................. H04L 9/08; G06Q 20/3829
See application file for complete search history.

(56) References Cited

U.S. PATENT DOCUMENTS

| | | | |
|---|---|---|---|
| 6,170,058 B1 | 1/2001 | Kausik | |
| 6,209,102 B1 | 3/2001 | Hoover | |
| 6,263,446 B1 | 7/2001 | Kausik et al. | |
| 6,908,030 B2 | 6/2005 | Rajasekaran et al. | |
| 6,928,427 B2 | 8/2005 | Rajasekaran et al. | |
| 6,956,950 B2 | 10/2005 | Kausik | |
| 6,983,381 B2 | 1/2006 | Jerdonek | |
| 7,167,565 B2 | 1/2007 | Rajasekaran | |
| 7,181,762 B2 | 2/2007 | Jerdonek | |
| 7,330,836 B2 * | 2/2008 | Kausik | 705/50 |
| 7,383,572 B2 | 6/2008 | Rolfe | |
| 7,596,689 B2 * | 9/2009 | Toh et al. | 713/150 |
| 7,613,284 B2 | 11/2009 | New | |
| 7,711,122 B2 | 5/2010 | Allen et al. | |
| 8,285,993 B1 | 10/2012 | Subramanian et al. | |
| 8,364,713 B2 * | 1/2013 | Pollard | 707/784 |
| 2001/0034837 A1 | 10/2001 | Kausik et al. | |

(Continued)

FOREIGN PATENT DOCUMENTS

WO 01/35685 A1 5/2001

OTHER PUBLICATIONS

Alexander, et al., "Arcot and Adobe Team on Correspondence Management Solution", Financial Services Institutions Gain New Security Options for Customer Email, Adobe Systems Incorporated, Apr. 20, 2009, Sunnyvale, California, 2 pages.

(Continued)

*Primary Examiner* — Tae Kim
*Assistant Examiner* — Louis Teng
(74) *Attorney, Agent, or Firm* — Vierra Magen Marcus LLP (57) ABSTRACT

Securely providing secret information, such as PINs, to users via an encrypted electronic document is disclosed. The user might receive the encrypted electronic document as an attachment to an e-mail or might access the encrypted electronic document from a web site, as two examples. In order to open the encrypted electronic document, the user may need to provide some information that is on a physical banking card that was issued to the user. Therefore, an extra level of security is provided in that the user needs to be in possession of the physical banking card that may have been delivered by traditional mail, as well as the encrypted electronic document which is delivered via an electronic network.

20 Claims, 7 Drawing Sheets

(56) References Cited

U.S. PATENT DOCUMENTS

| | | | |
|---|---|---|---|
| 2002/0128969 A1* | 9/2002 | Parmelee et al. | 705/42 |
| 2002/0147914 A1* | 10/2002 | Arnold | 713/186 |
| 2005/0010751 A1 | 1/2005 | Nahlinder et al. | |
| 2005/0097335 A1* | 5/2005 | Shenoy et al. | 713/182 |
| 2009/0199272 A1 | 8/2009 | Gopalakrishna | |
| 2010/0169651 A1* | 7/2010 | Scheidt | 713/176 |
| 2010/0217999 A1* | 8/2010 | Seaton et al. | 713/185 |
| 2011/0113245 A1 | 5/2011 | Varadarajan | |
| 2011/0208964 A1 | 8/2011 | Sama | |
| 2012/0023009 A1* | 1/2012 | Pazlar et al. | 705/39 |
| 2012/0257746 A1 | 10/2012 | Brown et al. | |
| 2013/0104209 A1* | 4/2013 | Nandakumar | 726/7 |

OTHER PUBLICATIONS

ArcotID Client Reference Guide, Version 6.0, Arcot Systems, Inc., Jun. 2009, Sunnyvale, California, 118 pages.

Bond, et al., "Laser-printed PIN Mailer Vulnerability Report", Computer Laboratory, University of Cambridge, Jul. 31, 2005, 6 pages.

CA ArcotID, Technology Brief, CA Technologies, Retrieved on Jan. 24, 2013, Retrieved from the Internet: <URL: http://www.ca.com/~/media/files/technologybriefs/ca-arcotid-tech-brief.aspx>, 21 pages.

Data Security Standard, Payment Card Industry (PCI), Requirements and Security Assessment Procedures, Version 2.0, Oct. 2010, 75 pages.

Host Command Reference Manual, Host Security Module 8000, 1270A351 Issue 8, Thales, Mar. 8, 2009, 464 pages.

Host Security Module 8000, Thales, Mar. 27, 2006, Retrieved from the Internet: <URL:http://www.thalesgroup.com/Press_Releases/Documents/Thales_Host_Security_pdf/>, 6 pages.

Host Security Module RG7000, Operations and Installations Manual, 1270A513 Issue 3, Zaxus, Retrieved on Jan. 24, 2013, Retrieved from the Internet: <URL:http://cryptome.org/gag/HSM_I&O_Manual_270A513-3.pdf>, 202 pages.

* cited by examiner

METHOD AND SYSTEM TO SECURELY SEND SECRETS TO USERS

BACKGROUND

The present disclosure relates to securely providing secret information to users via electronic communication.

Banks (and enterprises in general) around the world provide users with cards, such as Automated Teller Machine (ATM) cards, credit cards, banking cards, etc. Such cards often have Personal Identification Number (PIN) codes associated with them. In some cases, the PIN code may be entered by the user when using the card, such as entering the PIN when making a withdrawal at an ATM machine. The card issuer typically generates a PIN for each card held by an account holder, in accordance with a defined algorithm.

One problem is how to securely provide the user with the PIN. Banks (and enterprises in general) around the world send PIN mailers to users. For example, a bank may send the ATM/Debit card PIN via a paper-based PIN mailer. Similarly banks often send the Internet Banking/eBanking password using a paper-based PIN mailer. These paper-based PIN mailers are designed to send shared secrets such as ATM PINs, one time passwords (OTPs), or activation codes to users. Large banks may distribute a million or more paper-based PIN mailers every month.

Technology has been developed for efficiently printing such PIN mailers. In one technique, a single printing pass with a conventional laser printer can be used to print an envelope that includes the user's name and address in clear text, while printing the PIN code such that it is hidden from view. This may be accomplished by first adhering a special laser PIN label to the envelope. The special laser PIN label may have a pigmented layer beneath a clear polymer coating. In one technology, the secret (e.g., PIN code) is printed onto a surface of the clear polymer coating, but obscured by a random pattern of black dots beneath in the pigmented layer beneath the surface.

Unfortunately, paper-based PIN mailers are expensive (printing cost, postal/courier cost). Also, paper-based PIN mailers are inconvenient to the users, as it takes a fair amount of time to receive them through traditional postal delivery. Although paper-based PIN mailers are designed to be secure, it is difficult to ensure that only the intended recipient gets access to these sensitive paper documents once it is put into the postal/courier system for delivery.

Moreover, while the paper-based PIN mailers are intended to be tamper evident, they are not tamper proof. For example, paper-based PIN mailers are subject to several types of attacks that can read the PIN, without showing obvious evidence of tampering. One type of attack is image processing based in which a color difference between the toner on the surface of the clear polymer coating and the masking pattern below is exploited. Image processing attacks make use of commonly available computer programs that perform image processing. These programs can be used to capture an image of the paper-based PIN mailer and apply image processing techniques such as color intensity threshold functions, blurring, etc. to make the secret PIN code visible on a computer display.

In an angled light attack, the reflective properties of the toner on the surface of the clear polymer coating may be exploited to allow the naked eye to separate the PIN from the backing pattern. In such an attack, the user makes direct visual inspection with their eye at a severe angle to the PIN mailer. A light source may be held at about the same angle on the opposite side. In some, but not all cases, the PIN code can be read.

BRIEF SUMMARY

According to one aspect of the present disclosure a method of providing secret information is provided. The method comprises the following. An encryption key is generated based on information on a physical banking card. An electronic document that comprises a secret for using the physical banking card is encrypted with the encryption key. The encrypted electronic document is sent to the user. An authentication process is performed between a client device and a key server in which the client device responds based on the information on the physical banking card. A decryption key for decrypting the encrypted electronic document is provided to the client device in response to the authentication process authenticating the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Techniques are disclosed herein for securely providing secret information such as banking card PINs, Internet Banking password/Activation Codes, etc. to users via an encrypted electronic document. The user might receive the encrypted electronic document as an attachment to an e-mail or might access the encrypted electronic document from a web site, as two examples. In one embodiment, in order to open the encrypted electronic document the user needs to provide some information that is on a physical banking card that was issued to the user. Therefore, an extra level of security is provided in that the user needs to be in possession of the physical banking card that may have been delivered by traditional mail, as well as the encrypted electronic document which is delivered via an electronic network.

If the user has to download and install additional security software in order to complete the process, this could make it cumbersome for the user. Embodiments do not require that the user download and install additional security software on their client device. Rather, software that client devices typically have, such as electronic messaging programs, document readers, and Internet browsers may be used, in one embodiment.

Embodiments do not require that the user set up a secure communication channel in order to receive the secret information such as PIN code. Rather, the communication channel may be "insecure," such as e-mail or the Internet. If the user had to set up a secure communication channel, such as Secure SMS, this could be cumbersome. Also, some types of secure communication channels are not as secure as advertised.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium (including a computer readable storage medium) that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
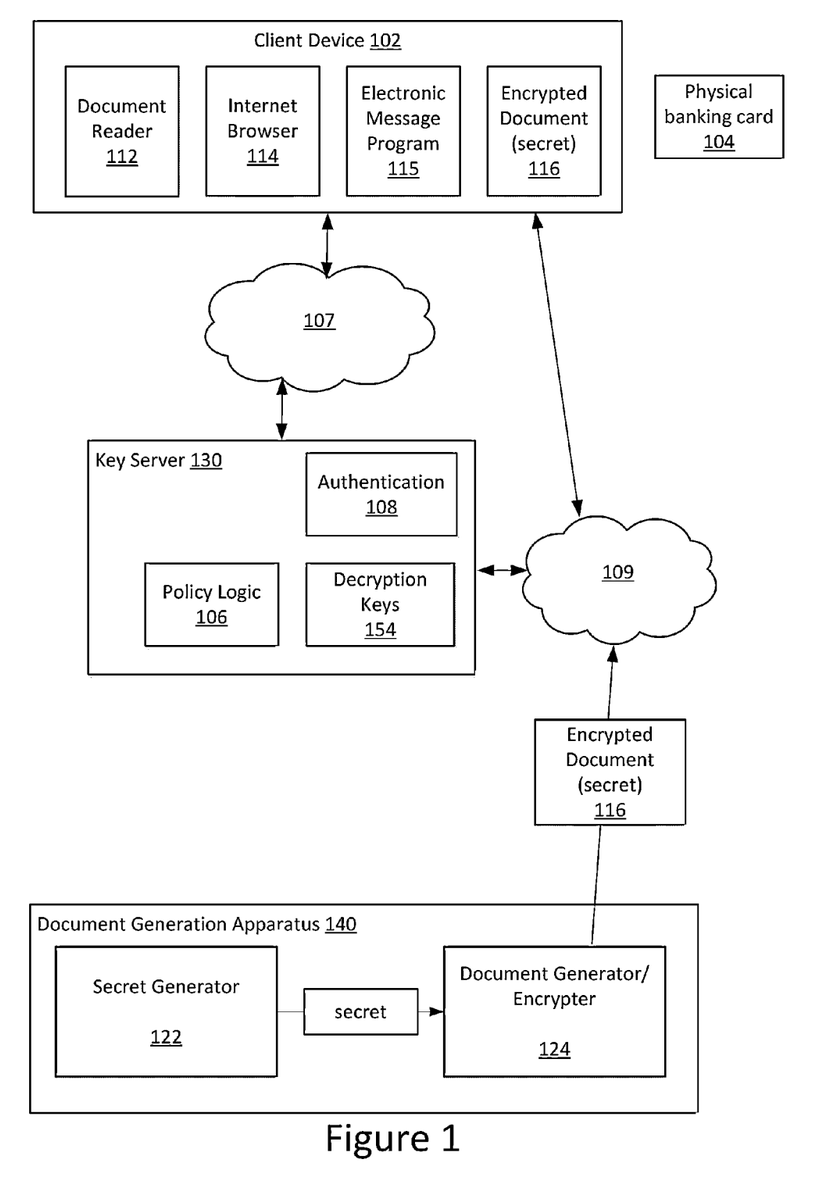
FIG. 1 shows an environment in which embodiments may be practiced.

FIG. 1 shows an environment in which embodiments may be practiced. The environment includes a document generation apparatus 140, key server 130, and client device 102. In general, to securely provide a secret to the user, the client device 102 accesses an encrypted electronic document 116. As one example, the client device 102 accesses an email that has an encrypted attachment. The client device 102 may authenticate with the key server 130 and, if successful, receive a decryption key. In one embodiment, the user of the client device 102 is also sent a physical banking card 104. Information on or associated with this physical banking card 104 may be used during the authentication process.

A physical banking card 104 is a physical card that is issued by a financial institution such as a bank, credit union, etc. Examples of banking cards include, but are not limited to, ATM cards, debit cards, and credit cards. ATM cards can also be referred to a client cards, keys cards and cash cards. Physical banking cards 104 often have Personal Identification Numbers (PINs) that are used with the card. For example, a user may enter the PIN into an ATM machine when performing a financial transaction.

The document generation apparatus 140 may comprise one or more computing devices. The document generation apparatus 140 is able to generate the encrypted electronic document 116. The document generation apparatus 140 has a secret generator 122 that is able to generate a secret that is to be provided to the client device 102 in a secure manner. The document generation apparatus 140 has a document generator/encrypter 124 that is able to form an electronic document that includes the secret, which may be accessed in the clear from the secret generator 122. Further, the document generator/encrypter 124 may also be able to encrypt the electronic document to produce the encrypted electronic document 116.

In one embodiment, the secret generator 122 is able to generate PIN codes. For example, secret generator 122 may generate PIN codes for physical banking cards 104. In one embodiment, the secret generator 122 includes a Hardware Security Module (HSM). The HSM may also be referred to as a Host Security Module. In one embodiment, the HSM acts as a peripheral device to a computer system. The HSM may be a specialized hardware device that is designed to be tamper-evident. HSMs are widely used in the financial industry. HSMs are able to perform cryptographic processing in a physically secure environment on behalf of a host (e.g., computer system). An HSM is able to perform processing in response to commands, which may be received via a serial data link, network, etc.

The secret generator 122 may be able to generate a PIN mailer. This could be accomplished by connecting a physical printer, such as a laser printer, to the HSM and printing onto an envelope that has a special PIN label thereon. However, instead of generating a PIN mailer, the PIN may be provided to the user via the encrypted electronic document 116, in accordance with embodiments.

The secret generator 122 may be implemented by some combination of software and hardware. As noted, the document generation apparatus 140 may comprise one or more computing devices. Thus, the document generation apparatus 140 may comprise one or more processors, as well as computer readable storage media. The secret generator 122 may be implemented, at least in part, by executing instructions on a processor of the document generation apparatus 140. Instructions for executing the secret generator 122 may be stored on computer readable storage media.

The document generator/encrypter 124 may be a software application that is able to generate electronic documents. As one example, the electronic document could have the well-known "Portable Document Format" (PDF). Another possible format is HTML. Other formats could be used.

The document generator/encrypter 124 may also be able to encrypt the electronic document. In one embodiment, the encryption is based on some information that is associated with the physical banking card 104 that is issued to a user. The encryption may also be based on some information that is known to the user that is not easily available to others, such as digits in an account number or social security number.

Once the encrypted electronic document 116 is generated, the document generation apparatus 140 may have the capability of providing it to a user by sending the encrypted electronic document 116 in a network 109. For example, the document generation apparatus 140 may be able to send the encrypted electronic document 116 as an attachment to an email that is addressed to the user to whom the secret pertains. As another example, the document generation apparatus 140 provides the encrypted electronic document 116 to a web server that the client device 102 contacts to obtain the encrypted electronic document 116. In this latter example, the web server could be considered to be part of the document generation apparatus 140.

The key server 130 may store decryption keys 154 for decrypting the encrypted electronic document 116 (and other such encrypted electronic documents). These decryption keys 154 may be provided by the document generation apparatus 140 over, for example, network 109.

The key server 130 may have authentication logic 108, which may be used to perform an authentication process with the client device 102, as well as other client devices not depicted in FIG. 1. This authentication process may be initiated by a client device 102 when a user attempts to open the encrypted electronic document 116. If authentication passes, the key server 130 may provide the appropriate decryption key to the client device 102.

The key server 130 may also have policy logic 106. The policy logic 106 may be used to control how many attempts may be made to open an encrypted electronic document 116. Thus, brute force attempts to authenticate can be thwarted.

The policy logic 106 can also provide reports to a bank that issued the physical banking card 104. These reports can indicate the IP address of a client device 102 that attempted to obtain the decryption key for an encrypted electronic document 116. Thus, if inappropriate attempts are made to open the encrypted electronic document 116, it may be possible to track down the source of these attempts. In one embodiment, the key server 130 provides the reports to the document generation apparatus 140.

The key server 130 may comprise one or more computing devices. The policy logic 106 and authentication 108 may be implemented by any combination of hardware and/or software. In one embodiment, the policy logic 106 and authentication 108 are implemented, at least in part, by executing instructions on a processor. The instructions may be stored on a computer readable storage media.

The client device 102 may be an electronic device having processing capability. The client device 102 may have a processor and have (or have access to) a computer readable storage medium. The client device 102 may store computer program instructions on the computer readable storage medium, which may be provided to the processor to execute to perform various functions/acts specified in the flowchart and/or block diagram block or blocks depicted herein. Examples of the client device 102 include, but are not limited to, a personal computer, a laptop computer, a notebook computer, a cellular telephone, a television, etc.

The client device 102 may have a document reader 112, which is a software program that is able to read at least one type of electronic document. As one example, the document reader 112 may read PDF documents. One example of such a document reader 112 is Adobe® Reader® software provided by Adobe Systems Inc. of San Jose, Calif. However, note that PDF documents can be read by other software programs.

Another type of document reader is a word processing software program. One type of word processing program is Microsoft® Word software, provided by Microsoft Corporation of Redmond, Wash.

The document reader 112 is able to open and read the encrypted electronic document 116, once it is decrypted, in one embodiment. Further details are described below.

The client device 102 may have an Internet (or web) browser 114. In one embodiment, a user is able to obtain the encrypted electronic document 116 over network 107 or 109 from a web site or the like using the Internet browser 114. Once the encrypted electronic document 116 is decrypted, the Internet browser 114 may be used to read the decrypted electronic document 116.

The electronic message program 115 is able to send and retrieve electronic messages. One example of electronic messages is e-mails. Depending on the format of the encrypted electronic document 116, once it is decrypted, the electronic message program 115 may be used to read the decrypted electronic document 116.

In some cases, more than one of the programs 112, 114, 115, 116, or other programs may work together to help open and read the encrypted electronic document 116. As one example, the encrypted electronic document 116 could be a PDF document that is attached to an e-mail. Hence, the electronic message program 115 and the document reader 112 might both be used.

The networks 107 and 109 can be the same, overlapping or distinct, and can include, e.g., the Internet, another wide area network, and/or a local area network.

Figure 2:
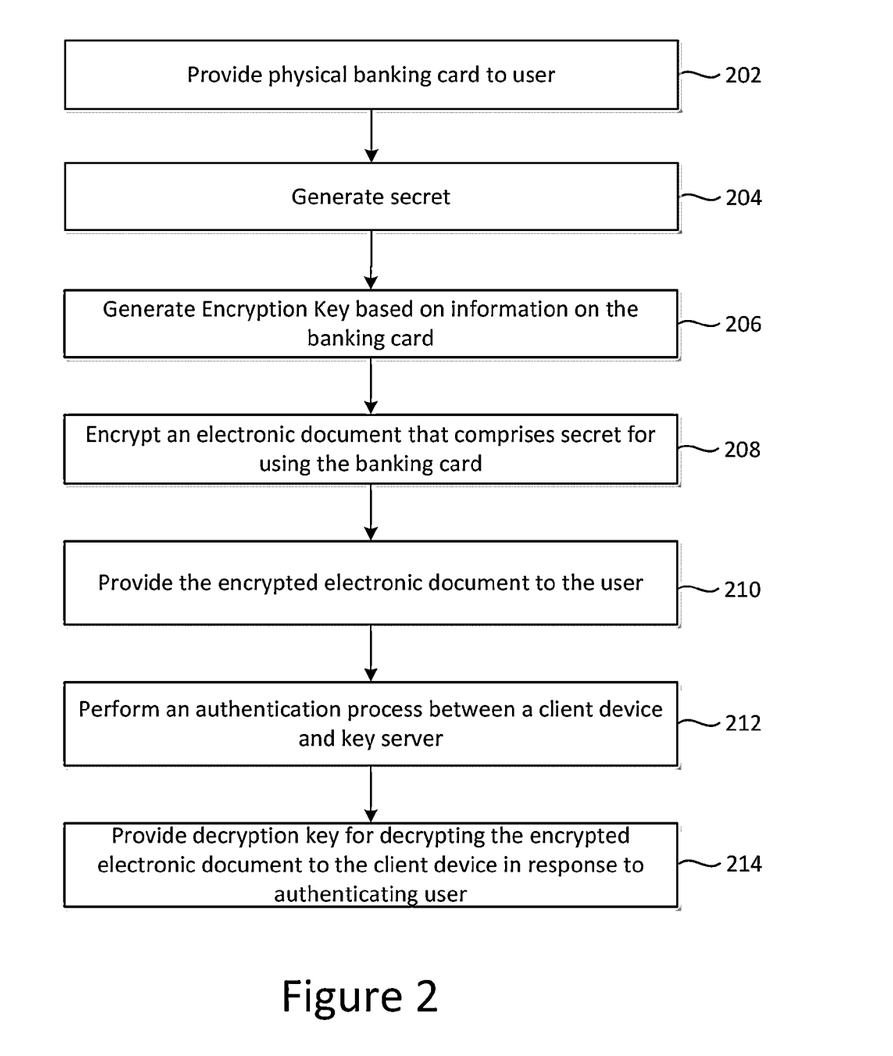
FIG. 2 is a flowchart of one embodiment of a process of securely providing secrets to a user via an encrypted electronic document.

FIG. 2 is a flowchart of one embodiment of a process of securely providing secrets to a user via an encrypted electronic document. The process can be practiced in an environment such as FIG. 1, but is not so limited. Steps 204-214 may be performed by a combination of hardware and/or software. In step 202, a physical banking card 104 is provided to a user to whom the card is issued. Step 202 may be achieved by depositing the physical banking card 104 with a postal service or courier service.

Step 204 may include generating a secret. The secret may be a password, such as a PIN code. This secret may be a code for using a physical banking card 104. In one embodiment, the secret is a password for online banking. In one embodiment, the secret is a one time password for online banking. Step 204 is performed by secret generator 122, in one embodiment.

Step 206 may include generating an encryption key based on first information on a physical banking card 104. An example of the first information is digits on an ATM card. The encryption key based may further be based on second information that is known to a user to whom the physical banking card 104 is issued. Examples of the second information include, but are not limited to, date of birth, account number, social security number. Step 208 is performed by document generator/encrypter 124, in one embodiment.

Step 208 may include encrypting an electronic document that comprises a secret for using the physical banking card 104 with the encryption key. In one embodiment, the electronic document is a PDF document. In one embodiment, the electronic document is an HTML document. Step 208 is performed by document generator/encrypter 124, in one embodiment. The generator/encrypter 124 is depicted in the document generation apparatus 140 in FIG. 1. However, the document generation apparatus 140 could be part of the key server 130, or elsewhere.

In one embodiment, the decryption key is not stored inside of the encrypted electronic document 116. This can make prevent attempts to decrypt the encrypted electronic document 116 by brute force attempts. Some brute force attempts rely on an offline tool that attempts to crack a password by trying different passwords until the correct password is found. However, such brute force attempts can be thwarted since the decryption key is not stored inside of the encrypted electronic document 116.

In one embodiment, step 208 includes a software application invoking a CA Arcot SEND interface, which is provided by CA Inc. of Islandia, N.Y. The CA Arcot SEND interface allows the creation of an encrypted electronic document (e.g., PDF). The CA Arcot SEND interface can create an encrypted electronic document from the secret (e.g., PIN) and a document template. The document template may be the same for all users to simplify the solution.

Step 210 may include sending the encrypted electronic document 116 to the user. In one embodiment, step 210 includes sending an email addressed to the user. The encrypted electronic document 116 may be attached to the email. In one embodiment, step 210 includes providing the encrypted electronic document 116 to a client device 102 over a network 109. This may include the client device 102 accesses a web site and requesting a download of the encrypted electronic document 116.

Step 212 may include performing an authentication process between a client device 102 and a key server 130. In step 212, the client device 102 may respond based on first information on the physical banking card and second information that is known to the user.

Step 214 may include providing a decryption key for decrypting the encrypted electronic document 116 to the client device 102 in response to the authentication process authenticating the user.

Figure 3A:
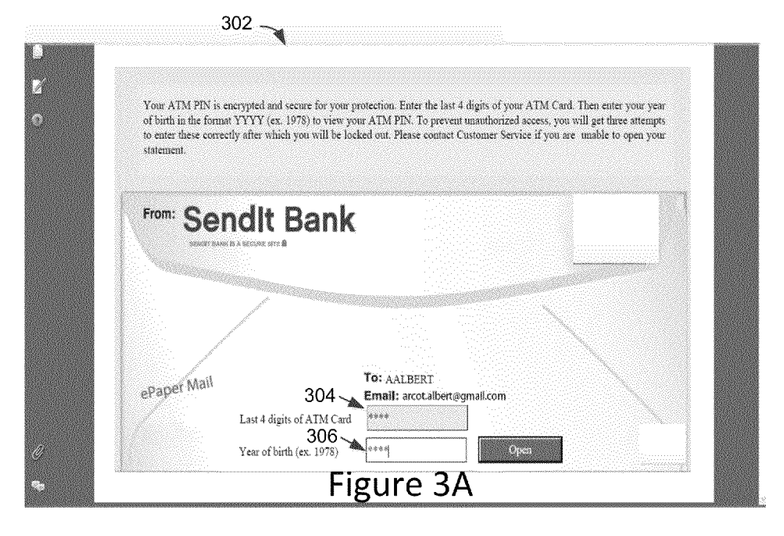
FIG. 3A is a diagram of one embodiment of an interface that is presented to a user when the user attempts to open the encrypted electronic document.

FIG. 3A is a diagram of one embodiment of an interface 302 that is presented to a user when the user attempts to open the encrypted electronic document 116. The user is shown a message that indicates that their ATM PIN has been encrypted for their protection. The user is requested to provide first information into box 304 and second information into box 306. In this example, the user is requested to enter the last four digits of the ATM card (e.g., physical banking card 104), along with their year of birth. Different information could be requested.

Figure 4:
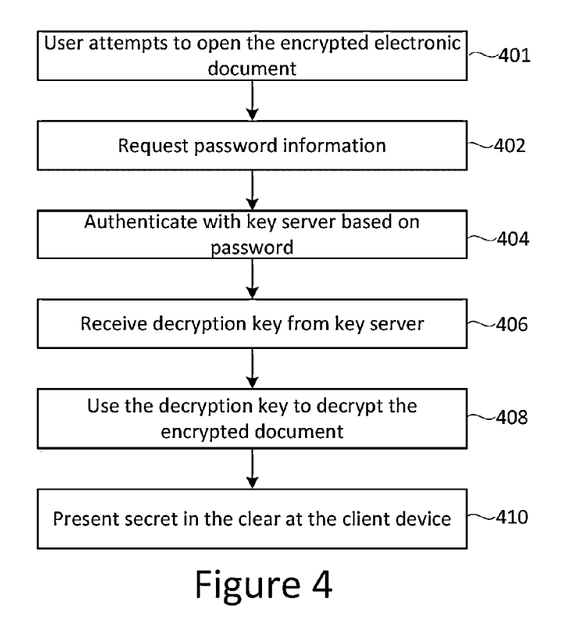
FIG. 4 is a process of actions at the client device when a user attempts to open an encrypted electronic document.

FIG. 4 is a process of actions at the client device 102 when a user attempts to open an encrypted electronic document 116. FIG. 3A will be referred to as one example, but it will be understood that the process of FIG. 4 is not limited to the example of FIG. 3A. Prior to the process, the user obtained the encrypted electronic document 116 at the client device. The encrypted electronic document 116 may have been sent as an attachment to an email or downloaded from a web portal, as two examples.

The process may be initiated, in step 401, by an attempt to open the encrypted electronic document 116. For example, the user may attempt to open an email attachment, or open a file that was downloaded from a network, such as the Internet. In one embodiment, the user attempts to open an encrypted PDF document. This may be with a PDF reader. In one embodiment, the user attempts to open an encrypted HTML document. This may be with a web browser.

In step 402, password information is requested at the client device 102. Step 402 may be in response to the attempt to open the encrypted electronic document 116. FIG. 3A depicts one such example in which the user is requested to enter first information into box 304 and second information into box 306. In that example, first information includes the last four digits of an ATM card. Thus, the user will need to have access to the ATM card to correctly have this information. The second information that is requested is some information that the user will know. It is not required that the user and the sender of the secret have previously exchanged this second information; however, that is one possibility.

In step 404, the client device 102 authenticates with the key server 130 based on the information provided by the user in step 402. In one embodiment, the software application that the user is using to attempt to open the encrypted electronic document 116 attempts to authenticate. In one embodiment, a PDF reader attempts to authenticate with the key server 130. Note that the client device 102 does not need to download special software, in some embodiments. In one embodiment, technology is built into a PDF reader that provides for authentication. For example, a PDF reader may have CA ArcotID® software built into it. CA ArcotID® software is provided by CA Inc. of Islandia, N.Y. If CA ArcotID® software is built into a PDF reader, the client device 102 can be authenticated and the PDF document can be decrypted without any additional software needed for authentication and/or decryption.

In one embodiment, a web browser on the client device 102 attempts to authenticate with the key server 130. Again, this may avoid the need for any additional software on the client device 102 to authenticate and/or decrypt. For example, an encrypted HTML document could be decrypted by a client device 102 having a web browser with JavaScript support and Internet access.

In one embodiment, the authentication involves a challenge-response sequence. In one embodiment, the client device 102 sends the password information to the key server 130. The password information may be encrypted by the client device 102 prior to being sent to the key server 130. Thus, the password information may be used to generate some other number that is sent to the key server 130. In general, the information sent by the client device 102 to authenticate may be referred to herein as a "datum." In one embodiment, the client device 102 has a PKI certificate that may have been issued by the key server 130, which may be used in the authentication. In one embodiment, the PKI certificate is sent by the client device 102 to the key server 130 during authentication. The key server 130 may use a key (e.g., user's public key) in the PKI certificate to decrypt an encrypted response from the client device 102 to the challenge.

In step 406, the decryption key is received by the client device 102 from the key server 130. This assumes that authentication was successful.

In step 408, the decryption key is used to decrypt the encrypted electronic document 116.

Figure 3B:
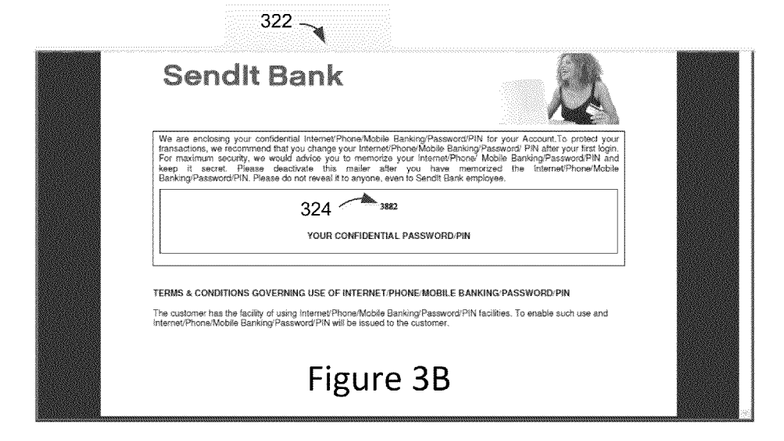
FIG. 3B is a diagram of one embodiment of a document that is presented to a user upon successful decryption of the encrypted electronic document.

In step 410, the secret is presented in the clear. FIG. 3B depicts one example of a document 322 that may be shown to a user. The document 322 includes the secret 324 (e.g., the numbers "3882" above the words, "Your Confidential Password PIN"), as well as other information. The other information may be general information that is sent to all users.

In one embodiment, the secret is displayed on a display device of, or associated with, the client device 102. In one embodiment, the secret is presented in audio format. In one embodiment, the secret is sent to a printer such that the user obtains a printed copy. The secret could be presented to the user in another manner. The secret is a PIN code for a physical banking card 104, in one embodiment. The secret is a one-time password for online banking, in one embodiment.

Figure 5:
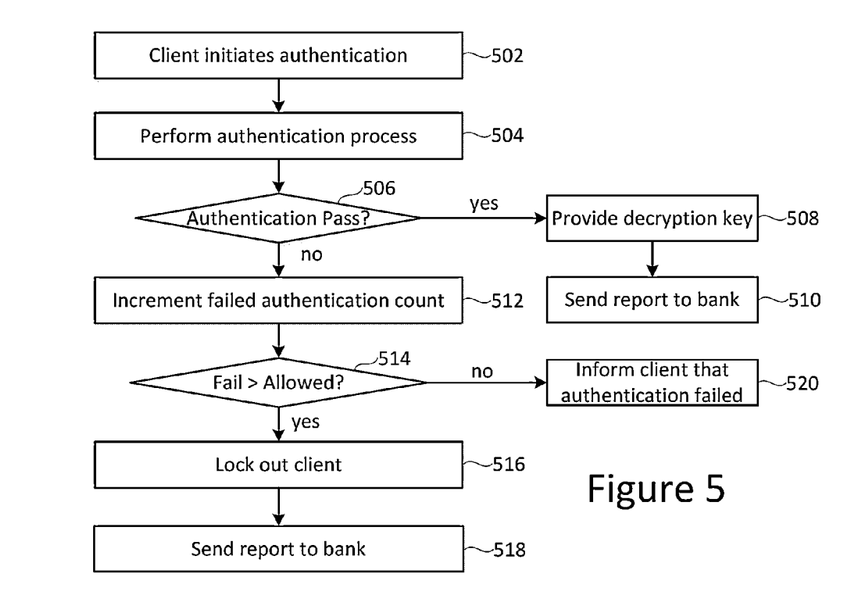
FIG. 5 is a flowchart of one embodiment of a process of actions performed at a key server.

FIG. 5 is a flowchart of one embodiment of a process of actions performed at a key server 130. These actions may be performed in response to a client device 102 requesting a decryption key. In step 502, the client device 102 initiates authentication with the key server 130. For example, the client device 102 requests the decryption key.

In step 504, an authentication process is conducted between the key server 130 and the client device 102. Step 504 may determine whether the user is entitled to have access to the secret. There are numerous types of authentication processes that can be used. In one embodiment, a challenge-response is used.

Step 504 may involve using CA ArcotID® software, which is provided by CA Inc. of Islandia, N.Y. In one embodiment, "cryptographic camouflage" technology is used. The effect of this process is that decryption, even using an incorrect password, will always produce a result that meets a specific, particular and well documented characteristics of a private key. Keys produced as result of using an invalid password meet all the characteristics of a valid key, so they can be functionally used to encrypt or "sign" a challenge. Thus, with such technology the client device 102 is able to sign the challenge by the key server 130.

However, to prove that it has obtained the true private key, the client device 102 needs to move further into the authentication process. The client device 102 is forced to encrypt/ "sign" the challenge with the password decrypted key and respond to the key server 130, which then determines whether or not a valid password was entered at the client device 102. If a valid password is not entered, the key server 130 can lock any access after a configurable number of invalid attempts. The client device 102 is able to attempt only a few passwords and is then prevented from further validation attempts. This thwarts offline brute-force attacks. Further details of Cryptographic Camouflage are described in U.S. Pat. No. 6,170,058, to Kausik, entitled "Method and Apparatus for Cryptographically Camouflaged Cryptographic Key Storage, Certification and Use, which is hereby incorporated by reference for all purposes. Note that the authentication process is not required to use the Cryptographic Camouflage technique.

In step 506, the key server 130 determines whether authentication passes. If so, the decryption key is provided to the client device 102, in step 508. The key server 130 may also send a report based in step 510. This report could be to a bank that issued the physical banking card 104. The report could include the IP address of the client device 102, how many attempts were made to open the encrypted electronic document 116, how many days passed between sending the encrypted electronic document 116 and it being successfully opened, etc.

If authentication fails, then at step 512 the key server 130 increments a count of the number of times that authentication failed. If the failure count is greater than an allowed number of attempts, then the client device 102 is locked out in step 516. Also, a report may be sent to a bank or other entity at step 518 indicating this failure. The report could include the client device 102 IP address, and corresponding derived information such as a city name, country, ISP used, etc.

If the number of failed attempts is not greater than the allowed number, then, in step 520, the key server 130 tells the client device 102 that authentication failed and that the user should be prompted to re-enter the requested information. The process may then return to step 502, which in this case is the client re-sending authentication information.

Figure 6:
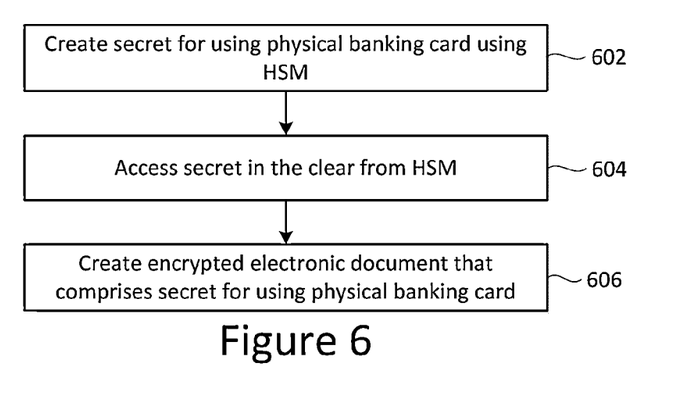
FIG. 6 is a flowchart of one embodiment of a process of creating an encrypted electronic document.

FIG. 6 is a flowchart of one embodiment of a process of creating an encrypted electronic document 116. The process may be performed by the document generation apparatus 140, or other entity. Prior to discussing the process, a brief discussion of HSMs will be provided. Typically an HSM is used in a real-time, online environment performing cryptographic key management, PIN and Message Authentication Code (MAC) related functions as required by the system.

An application program may sends command to the HSM and receive responses from the HSM. Each command and response may include a variable number of fields sent via a serial data link or network using variety of protocols including TCP/IP and UDP.

An HSM may support many types of cryptographic keys including the following.

An HSM may support an LMK (local master key). An LMK may be a set of keys stored in secure memory of the HSM. All other keys and secret data may be encrypted under the LMKs for local storage. The LMK may be the first key created in an HSM.

An HSM may support a ZMK (Zone Master Key). A ZMK may be a key-encrypting key (KEK). The ZMK may be used for transporting/sharing other keys between zones. In one embodiment, there is a zone associated with the generation of the secret (e.g., PIN code). Another zone is created to facilitate accessing the secret in the clear. Further details are described in connection with FIGS. 7A-7C. For local storage, a ZMK may be encrypted under one of the LMK keys. This key may be used as a wrapper to ensure that keys are not compromised during the transport process from one zone to another.

An HSM may support a ZPK (Zone PIN Key). The ZPK may be a data encrypting key (also referred to as a DEK). The ZPK may be used to encrypt data such as card PINs for transfer between communicating parties (e.g., between acquirers and issuers). For transmission, a ZPK may be encrypted under a ZMK. For local storage, a ZPK may be encrypted under one of the LMK keys.

An HSM may support a PVK (PIN Verification Key). A PVK may be a data-encrypting key which is used to generate and verify PIN.

Now that some details of HSMs and various key usages have been overviewed, the process of FIG. 6 will be described. In step 602, a secret for using a physical banking card 104 is created using an HSM. In one embodiment, the secret is a PIN code. In one embodiment, this secret is created in a zone that is associated with the issuer of the physical banking card 104. For reference, this will be referred to as a first zone. HSMs have commands to generate a PIN given a card number, account, or other information. The generation may use a variety of algorithms. In one embodiment, a software application issues commands to an HSM to instruct the HSM to perform various actions, such as PIN or key generation. The software application may be executing on a computer system that is external to the HSM. In one embodiment, the software application executes within the HSM.

As noted above, the HSM may have an LMK. The secret may be encrypted under the LMK. For example, a PIN code is generated based on a card number of the physical banking card 104 and/or an account number of the user to whom the physical banking card 104 is to be issued. Then, the PIN code is encrypted under the LMK.

Note that some conventional HSMs do not have an interface for accessing the secret (e.g., PIN code) in the clear (e.g., unencrypted or in clear text). The HSM may automatically decrypt the encrypted PIN inside the HSM and send appropriate instructions to an attached printer to print a PIN mailer containing this plain text PIN. However, the PIN should not be easily readable on the PIN mailer, without opening the PIN mailer.

Typically, when the secret is transferred from one device to another, the secret is encrypted. Moreover, the secret may be encrypted in a manner that is not easily decryptable by the recipient device. As noted above, the secret could be encrypted using a ZPK.

In step 604, the secret is accessed in the clear from the HSM. Further details of accessing the secret in the clear are discussed in connection with FIGS. 7A, 7B, and 7C. Step 604 is represented in FIG. 1 by the secret being accessed from the secret generator 122 and provided to the document generator/encrypter 124.

In one embodiment, step 604 includes creating a second zone for use within a domain of an issuer of the physical banking card 104, transferring the secret in encrypted form from the first zone to the second zone, and decrypting the secret in the second zone. Further details are discussed in connection with FIGS. 7A-7C.

In step 606, an encrypted electronic document 116 that comprises the secret for using the physical banking card 104 is created. In one embodiment, the document is encrypted using a strong encryption algorithm such as AES256. In one embodiment, the encryption key that is used can be generated using something the user will have (e.g., digits on a physical banking card 104 sent via courier/postal system) and/or something the user will know (e.g., last four digits of SSN, date of birth, Tax Payer ID, etc.).

The encryption key generated in one embodiment of step 606 is unique per encrypted electronic document 116 (and per user) and saved in a database after encryption with another HSM symmetric key (e.g., AES or 3DES). Step 606 may effectively tie the physical banking card 104 and PIN together. In one embodiment, the encrypted electronic document 116 cannot be decrypted without having the physical banking card 104 and the special knowledge of the user.

Figure 7A:
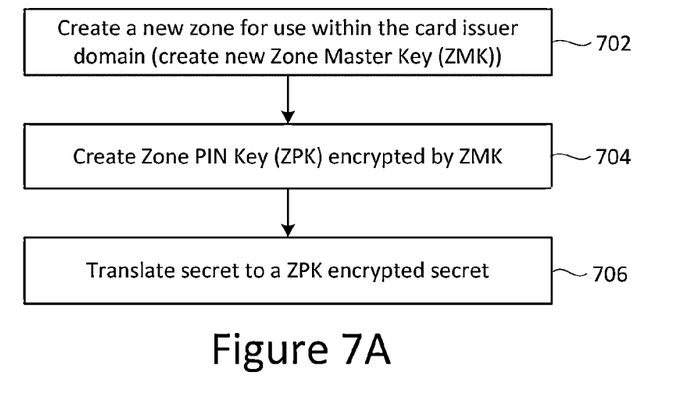
FIGS. 7A and 7B together describe one embodiment for accessing a secret in the clear from a Hardware Security Module (HSM).
Figure 7B:
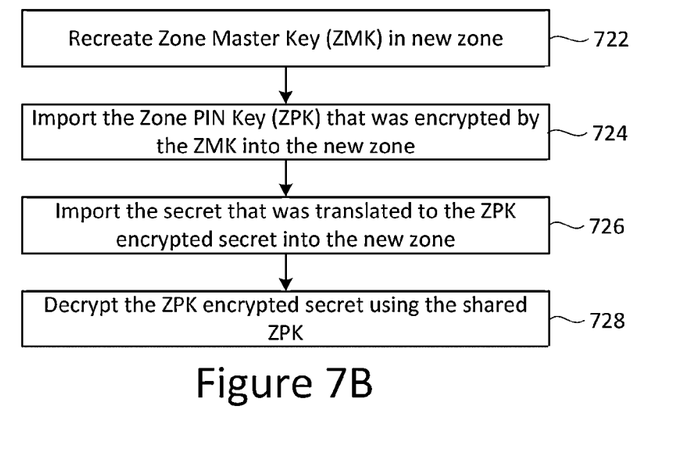

FIGS. 7A and 7B together describe one embodiment for accessing a secret in the clear from an HSM. Thus, these processes may be used to implement step 604 of FIG. 6. The processes of FIGS. 7A and 7B may be performed by the document generation apparatus 140. In one embodiment, these processes are performed by a software application that executes on a computer system external to the HSM and sends commands to the HSM.

Figure 7C:
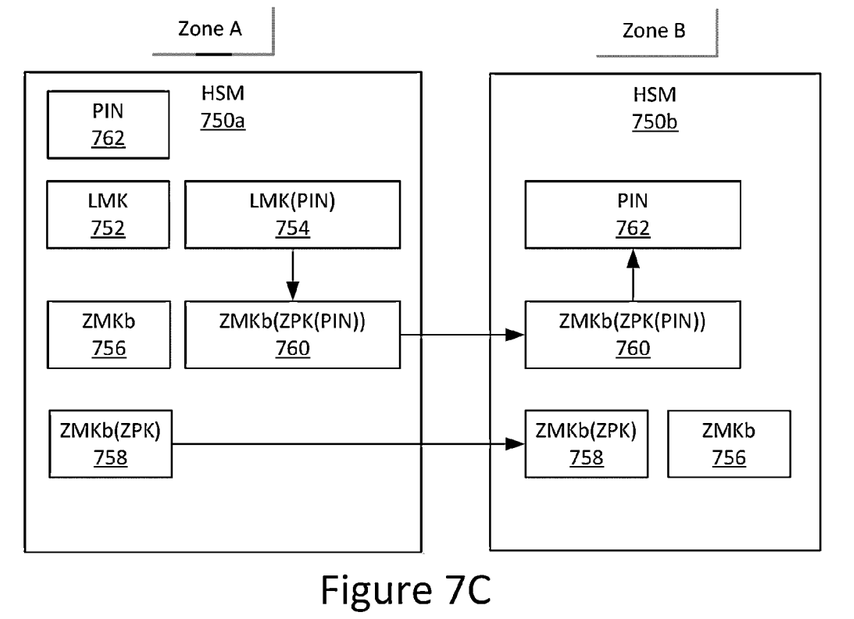
FIG. 7C depicts an example of accessing a secret in the clear from an HSM.

FIG. 7C depicts two HSMs that may be used when accessing a PIN in the clear from an HSM, and will be referred to when describing the processes of FIGS. 7A and 7B. Referring to FIG. 7C, HSM 750*a* is used to generate the PIN. HSM 750*b* is used to access the PIN in the clear. HSM 750*a* is associated with Zone A. HSM 750*b* is associated with Zone B. The process of FIG. 6 may use HSM 750*a* to generate the PIN 762. HSM 750*a* has LMK 752, under which the PIN is encrypted. The encrypted PIN is represented by the LMK(PIN) 754. Prior to the processes of FIGS. 7A and 7B, a secret was created. Step 602 of FIG. 6 is one example of creating a secret.

In step 702, a Zone Master Key (ZMK) is created for a special zone that is set up to allow the secret to be accessed in the clear. This zone may be created for use within the domain of the issuer of the physical banking card 104. In one embodiment, the ZMK is created using three random components. In one embodiment, a GG command is issued to a Thales 8000 HSM. The three components are saved (e.g., in computer memory).

As noted, step 702 may include creating a second zone for use within a domain of an issuer of the physical banking card 104. This may include creating a zone master key (ZMK) for sharing keys between the zone A and the zone B. In step 702, ZMKb 756 is created in association with HSM 750*a*. As noted above, the ZMKb 756 may be created with three random components, which were saved. Thus, in step 702, these saved components may be retrieved from computer memory.

Step 704 includes creating a zone PIN key (ZPK) that is encrypted by the ZMK. In step 704, the Zone PIN Key (ZPK) may be encrypted in the HSM by the ZMK that was created in step 702. This can be achieved by issuing an HSM command such as A0 or A1 in a Thales 8000 HSM. The ZPK is saved under the ZMK. This is represented in FIG. 7C by ZMKb (ZPK) 758.

Step 706 may include translating the secret to a ZPK encrypted secret. In step 706, the LMK encrypted secret (e.g., from step 602) may be translated to a ZPK encrypted secret. This is the ZPK created in step 704. For example, an LMK encrypted PIN may be translated to a ZPK encrypted PIN by issuing a JG command to Thales 8000 HSM. This ZPK encrypted PIN is saved. Step 706 is represented in FIG. 7C by ZMKb(ZPK(PIN)) 760 being formed from LMK(PIN) 754.

FIG. 7B describes further details for obtaining the secret in the clear. In step 722, the newly created ZMK from step 702 is re-created in Zone B. This may be accomplished by inputting the same three components that were used in step 702. This is represented in FIG. 7C by ZMKb 756 depicted in HSM 750b. For purposes of discussion, two HSMs are depicted in FIG. 7C. In one embodiment, rather than using two HSMs 750a, 750b, a single HSM 750 is used.

In step 724, the ZPK encrypted under ZMK (from step 704) is imported into the new zone (e.g., Zone B). Step 724 may include transferring the ZPK encrypted under ZMK from the zone in which the secret was originally created (e.g., Zone A) to the newly created zone (e.g., Zone B). After step 724, both zones have a shared ZPK. This is represented in FIG. 7C by ZMKb(ZPK) 758 being transferred from HSM 750a to HSM 750b. Note that both zones also have ZMKb 756.

In step 726, the secret that was encrypted under the ZPK (in step 706) is imported into the new zone (e.g., Zone B). Step 726 may include transferring the secret that was encrypted under the ZPK from the zone in which the secret was originally created to the newly created zone. This is represented in FIG. 7C by ZMKb(ZPK(PIN)) 760 being transferred from HSM 750a in Zone A to HSM 750b in Zone B.

In step 728, the ZPK encrypted secret is decrypted using the shared ZPK. This produces the secret in the clear. Thus, a PIN code in the clear can be accessed. This is represented in FIG. 7C by the PIN 762 being derived from ZMKb(ZPK (PIN)) 760. Step 728 may include using ZMKb 756 and ZMKb(ZPK) 758 to derive the PIN in the clear 762.

After the PIN is accessed in the clear, it may be provided to document generator/encrypter 124 to form the encrypted electronic document 116 that contains the secret (e.g., the PIN code).

Note that it is not always necessary to use a process such as FIGS. 7A and 7B to access the secret in the clear. In one embodiment, a software program is loaded onto and run on the HSM. The software program may instruct the HSM to output the secret in the clear.

Figure 8:
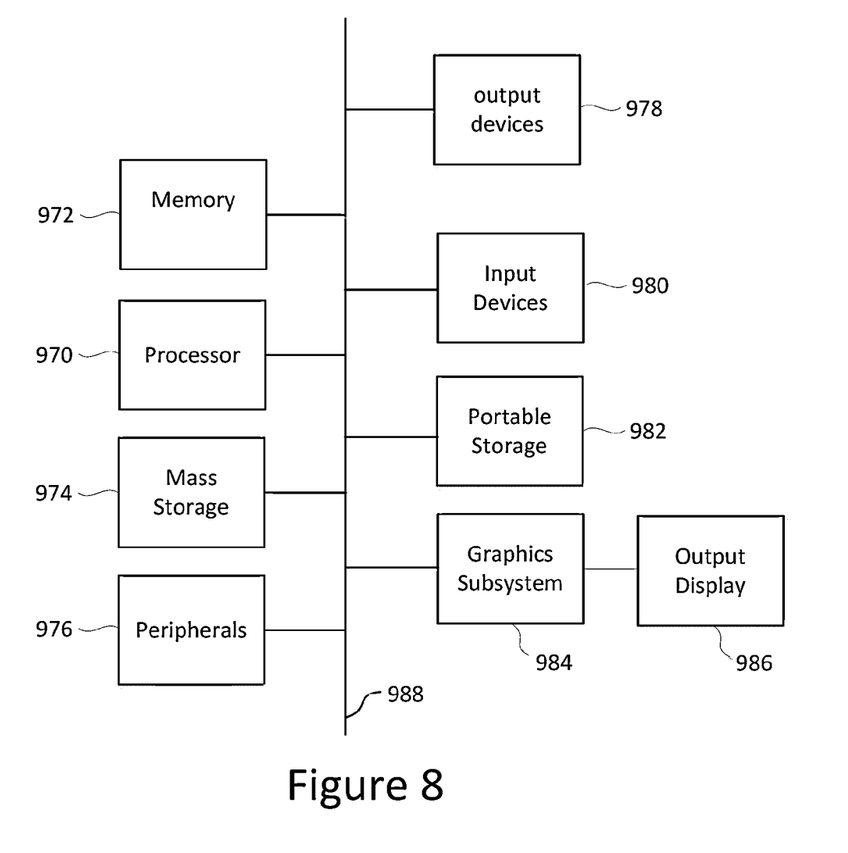
FIG. 8 illustrates a high level block diagram of a computer system which can be used to implement the technology described herein.

FIG. 8 illustrates a high level block diagram of a computer system which can be used to implement the technology described herein. The computer system could be used to implement client device 102, key server 130, and/or document generation apparatus 140. In some cases, multiple computer systems are used to implement one of the foregoing.

The computer system of FIG. 8 includes a processor unit 970 in communication with main memory 972. Processor unit 970 may contain a single microprocessor, or may contain a plurality of microprocessors for configuring the computer system as a multi-processor system. These one or more processors can perform the methods described above. Main memory 972 stores, in part, instructions and data for execution by processor unit 970. If the system described herein is wholly or partially implemented in software, main memory 972 can store the executable code when in operation. Main memory 972 may include banks of dynamic random access memory (DRAM) as well as high speed cache memory. For example, main memory 972 can store the document reader 112, internet browser 114, electronic message program 115, encrypted document 116, policy logic 106, authentication 108, decryption keys 154, secret generator 122, document generator/encrypter 124, etc.

The system of FIG. 8 further includes a mass storage device 974, peripheral device(s) 976, user input device(s) 980, output devices 978, portable storage medium drive(s) 982, a graphics subsystem 984 and an output display 986. For purposes of simplicity, the components shown in FIG. 8 are depicted as being connected via a single bus 988. However, the components may be connected through one or more data transport means. For example, processor unit 970 and main memory 972 may be connected via a local microprocessor bus, and the mass storage device 974, peripheral device(s) 976, portable storage medium drive(s) 982, and graphics subsystem 984 may be connected via one or more input/output (I/O) buses. Mass storage device 974, which may be implemented with a magnetic disk drive or an optical disk drive, is a non-volatile storage device for storing data and instructions for use by processor unit 970. In one embodiment, mass storage device 974 stores the system software for implementing the technology described herein for purposes of loading to main memory 972. Mass storage device 974 can also be used to store the decryption keys 154 and encrypted document 116. Peripheral device(s) 976 may include any type of computer support device, such as an input/output (I/O) interface, to add additional functionality to the computer system. For example, peripheral device(s) 976 may include a network interface for connecting the computer system to a network, a modem, a router, etc. User input device(s) 980 provides a portion of a user interface (e.g., to allow user to input information to open the encrypted document 116). User input device(s) 980 may include an alpha-numeric keypad for inputting alpha-numeric and other information, or a pointing device, such as a mouse, a trackball, stylus, or cursor direction keys. In order to display textual and graphical information, the computer system of FIG. 8 includes graphics subsystem 984 and output display 986. Output display 986 may include a cathode ray tube (CRT) display, liquid crystal display (LCD) or other suitable display device. Graphics subsystem 984 receives textual and graphical information, and processes the information for output to display 986. Additionally, the system of FIG. 8 includes output devices 978. Examples of suitable output devices include speakers, printers, network interfaces, monitors, etc.

The components contained in the computer system of FIG. 8 are those typically found in computer systems suitable for use with the technology described herein, and are intended to represent a broad category of such computer components that are well known in the art. Thus, the computer system of FIG. 8 can be a personal computer, mobile computing device, smart phone, tablet, workstation, server, minicomputer, mainframe computer, or any other computing device. The computer can also include different bus configurations, networked platforms, multi-processor platforms, etc. Various operating systems can be used.

One embodiment includes a method comprising generating an encryption key based on information on a physical banking card, encrypting an electronic document that comprises a secret for using the physical banking card with the encryption key, sending the encrypted electronic document to the user, performing an authentication process between a client device and a key server in which the client device responds based on the information on the physical banking card, and providing a decryption key for decrypting the encrypted electronic document to the client device in response to the authentication process authenticating the user.

One embodiment includes a system comprising a processor configured to generate an encryption key based on first information on a physical banking card and second information that is known to a user to whom the physical banking card is issued, encrypt an electronic document that comprises a secret for using the physical banking card with the encryption key; send the encrypted electronic document over a network, receive a request from a client device for a decryption key for the encrypted electronic document, perform an authentication process with the client device to determine whether to provide the decryption key to the client device, and send the decryption key to the client device if the authentication process passes, to pass authentication requires that the client device provide a datum that is based on the first information that is on the physical banking card and the second information that is known to the user.

A computer program product comprising a computer readable storage medium having computer readable program code embodied therewith. The computer readable program code comprises computer readable program code configured to receive, at a client device, an encrypted electronic document that comprises a secret for using a physical banking card that has been issued to a user. The computer readable program code is configured to receive a request at the client device to open the encrypted electronic document. The computer readable program code is configured to request first information that is on the physical banking card and second information that is known to the user at the client device. The computer readable program code is configured to perform an authentication process between the client device and a key server based on the first information and the second information. The computer readable program code configured to receive a decryption key for decrypting the encrypted electronic document at the client device in response to the authentication process authenticating the user. The computer readable program code is configured to use the decryption key to decrypt the encrypted electronic document at the client device. The computer readable program code is configured to present the secret in the clear at the client device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
sending, from a computer to a first device attached to the computer, a command to a first hardware security module (HSM) executing on the first device attached to the computer to create a first zone within a domain of an issuer of a physical banking card;
sending, from the computer to the first device, a command to the first HSM to create a secret password for using the physical banking card;
sending, from the computer to a second device attached to the computer, a command to a second hardware security module (HSM) executing on the second device attached to the computer to create a second zone for use within the domain of the issuer of the physical banking card;
sending, from the computer to the first device, a command to the first HSM to transfer an encrypted version of the secret password from the first zone to the second zone of the second hardware security module (HSM);
sending, from the computer to the second device, a command to the second HSM to decrypt the encrypted version of the secret password in the second zone;
accessing, by the computer from the second device, the decrypted secret password from the second HSM;
generating, by the computer, an encryption key based on information on the physical banking card;
encrypting, by the computer, an electronic document that comprises the decrypted secret password for using the physical banking card with the encryption key;
providing the encrypted electronic document to a client device associated with a user that is associated with the physical banking card;
performing an authentication process between the client device and a key server in which the client device responds based on the information on the physical banking card; and
providing a decryption key for decrypting the encrypted electronic document to the client device in response to the authentication process authenticating the user.

2. The method of claim 1, further comprising:
tracking, at the key server, how many times the client device has attempted to authenticate in an attempt to receive the decryption key; and refusing any requests for the decryption key if more a threshold number of failed attempts to receive the decryption key have been made.

3. The method of claim 1, further comprising:
tracking, at the key server, an IP address of the client device that has attempted to obtain the decryption key; and
providing the IP address to an issuer of the physical banking card.

4. The method of claim 1, further comprising:
refusing any requests for the decryption key if more than a pre-determined amount of time has passed since the encrypted electronic document was provided to the user.

5. The method of claim 1, wherein the secret for using the physical banking card comprises a PIN code.

6. The method of claim 1, further comprising:
sending a command from the computer to the first HSM to create a zone master key (ZMK) for sharing keys between the first zone and the second zone;
sending a command from the computer to the first HSM to create a zone PIN key (ZPK) that is encrypted by the ZMK; and
sending a command from the computer to the first HSM to translate the secret to a ZPK encrypted secret.

7. The method of claim 6, further comprising:
sending a command from the computer to the second HSM to recreate the ZMK in the second zone;
sending a command from the computer to the first or second HSM to import the ZPK that is encrypted by the ZMK into the second zone;
sending a command from the computer to the first or second HSM to import the ZPK encrypted secret into the second zone; and
sending a command from the computer to the second HSM to decrypt the ZPK encrypted secret using the ZPK.

8. The method of claim 1, further comprising:
sending the physical banking card to the user.

9. The method of claim 1, wherein the first device and the second device are the same physical device.

10. The method of claim 1, wherein the providing the encrypted electronic document to the client device associated with the user comprises sending an email addressed to the user, the encrypted electronic document is an attachment to the email.

11. The method of claim 1, wherein the providing the encrypted electronic document to the client device associated with the user comprises providing the encrypted electronic document from a server to the client device over a network.

12. A system comprising:
a computer readable storage medium having executable code; and
a hardware processor in communication with the computer readable storage medium, when the hardware processor executes the code the hardware processor:
instructs a first Hardware Security Module (HSM) on a device connected to the system to create a first zone within a domain of an issuer of a physical banking card;
instructs the first HSM to create a secret password for using the physical banking card;
instructs a second Hardware Security Module (HSM) on a device connected to the system to create a second zone within the domain of the issuer of the physical banking card;
instructs the first HSM to transfer an encrypted version of the secret password from the first zone to the second zone of the second HSM;
instructs the second HSM to decrypt the encrypted version of the secret password in the second zone;
accesses the secret password in the clear from the second HSM;
generates an encryption key based on first information on the physical banking card and second information that is known to a user to whom the physical banking card is issued;
encrypts an electronic document that comprises the decrypted secret password for using the physical banking card with the encryption key;
sends the encrypted electronic document over a network to a client device associated with the user;
receives a request from the client device for a decryption key for the encrypted electronic document;
performs an authentication process with the client device to determine whether to provide the decryption key to the client device; and
sends the decryption key to the client device if the authentication process passes, to pass authentication requires that the client device provide a datum that is based on the first information that is on the physical banking card and the second information that is known to the user.

13. The system of claim 12, wherein the hardware processor further:
tracks how many times the client device has attempted to authenticate in an attempt to receive the decryption key; and
refuses any requests for the decryption key if more a threshold number of failed attempts to receive the decryption key have been made.

14. The system of claim 12, wherein the hardware processor further:
tracks an IP address of the client device that has attempted to obtain the decryption key; and
provides the IP address in a report.

15. The system of claim 12, wherein the hardware processor further:
refuses any requests for the decryption key if more than a pre-determined amount of time has passed since the encrypted electronic document was sent over the network.

16. The system of claim 12, wherein the secret password for using the physical banking card comprises a PIN code.

17. The system of claim 12, wherein the hardware processor further:
instructs the first HSM to create a zone master key (ZMK) for sharing keys between the first zone and a second zone;
instructs the first HSM to create a zone PIN key (ZPK) that is encrypted by the ZMK;
instructs the first HSM to translate the secret to a ZPK encrypted secret.

18. The system of claim 17, wherein the hardware processor:
instructs the second HSM to recreate the ZMK in the second zone;
instructs the first or the second HSM to import the ZPK that is encrypted by the ZMK into the second zone;
instructs the first or the second HSM to import the ZPK encrypted secret into the second zone; and
instructs the second HSM to decrypt the ZPK encrypted secret using the ZPK.

19. A method comprising:
creating, by a first hardware security module (HSM), a first zone within a domain of an issuer of a physical banking card, wherein the first HSM executes on a peripheral device to an electronic device;

creating, by the first HSM, a secret password in the first zone for using the physical banking card;

creating, by a second hardware security module (HSM), a second zone for use within the domain of the issuer of the physical banking card, wherein the second HSM executes on a peripheral device to the electronic device;

transferring an encrypted version of the secret password from the first HSM to the second HSM, including transferring from the first zone to the second zone;

decrypting, by the second HSM, the encrypted version of the secret password in the second zone of the second HSM;

accessing, by the electronic device, the decrypted secret password from an interface of the second HSM;

generating, by the electronic device, an encryption key based on information on the physical banking card;

encrypting, by the electronic device, an electronic document that comprises the decrypted secret password for using the physical banking card with the encryption key;

providing, by the electronic device, the encrypted electronic document to a client device associated with a user that is associated with the physical banking card;

performing an authentication process between the client device and a key server in which the client device responds based on the information on the physical banking card; and providing a decryption key for decrypting the encrypted electronic document to the client device in response to the authentication process authenticating the user.

20. The method of claim 19, wherein the encrypted electronic document is a first electronic document, the providing, by the electronic device, the encrypted electronic document to a client device associated with a user that is associated with the physical banking card comprises:

sending a second electronic document as an email addressed to the user associated with the physical banking card with the encrypted first electronic document attached to the email, the second electronic document comprises a first field for receiving information on the physical banking card and a second field for receiving information that is something the user knows.

* * * * *